United States Patent [19]
Bienz

[11] Patent Number: 5,781,459
[45] Date of Patent: Jul. 14, 1998

[54] METHOD AND SYSTEM FOR RATIONAL FREQUENCY SYNTHESIS USING A NUMERICALLY CONTROLLED OSCILLATOR

[76] Inventor: Richard Alan Bienz, 1830 W. Alamo Dr., Chandler, Ariz. 85224

[21] Appl. No.: 639,040

[22] Filed: Apr. 16, 1996

[51] Int. Cl.[6] ............... G06F 1/02; H03K 3/017; H03K 5/04; H03K 7/08
[52] U.S. Cl. ...................... 364/718.02; 327/175
[58] Field of Search ................. 364/718, 721, 364/718.02, 703, 723; 327/105, 129, 130, 131, 175, 237

[56] References Cited

U.S. PATENT DOCUMENTS

| | | |
|---|---|---|
| 4,053,739 | 10/1977 | Miller et al. ............... 364/703 |
| 4,555,793 | 11/1985 | Benamy ..................... 377/48 |
| 4,658,406 | 4/1987 | Pappas ....................... 377/48 |
| 4,998,072 | 3/1991 | Sheffer ...................... 327/106 |
| 5,179,348 | 1/1993 | Thompson .................. 327/105 |
| 5,521,534 | 5/1996 | Elliot ......................... 327/129 |

*Primary Examiner*—Paul P. Gordon
*Assistant Examiner*—Robert J. Dolan
*Attorney, Agent, or Firm*—Walter W. Nielsen

[57] ABSTRACT

A numerically controlled oscillator (11), (NCO), generates an NCO output (114) having a time-averaged frequency proportional to a rational number, even if the number of bits in the binary frequency control numbers (104, 106) is insufficient to represent the fractional part of the rational frequency number precisely. Frequency control numbers (104, 106) alternate between numerically adjacent values proportional to the desired time-averaged rational frequency control number. Frequency control numbers and their duty cycles are calculated for synthesizing a time-averaged rational frequency.

16 Claims, 2 Drawing Sheets

METHOD AND SYSTEM FOR RATIONAL FREQUENCY SYNTHESIS USING A NUMERICALLY CONTROLLED OSCILLATOR

FIELD OF THE INVENTION

This invention relates generally to frequency synthesis and, more particularly, to rational frequency synthesis using numerically controlled oscillators.

BACKGROUND OF THE INVENTION

Traditional frequency synthesizers utilize phase locked loops to control oscillators. By monitoring the output phase/frequency, the voltage controlled oscillator produces precisely controlled output frequencies. The spectral purity of output signals generated by a phase locked loop is generally very high, because the loop acts as a narrow tracking filter. The narrow loop bandwidth, however, limits synthesizer tuning speed, which is a major limitation.

Digital synthesizer technology utilizes high speed digital circuitry to numerically generate a frequency stable sinewave pattern. Numerically controlled oscillators (NCO), as digital synthesizers are most frequently called, may be used to quickly generate sinusoidal signals to a fraction of a hertz. The granularity of the output frequencies has generally been limited by the input clock rate to NCOs. In most static environments, NCOs frequency resolution is sufficient for frequency resolution. However, in dynamic environments where movement of transceiving bodies introduce small Doppler frequency components, typical resolution capabilities of NCOs are insufficient.

One typical environment where NCO resolution due to Doppler frequency components is most prominent is in generating arbitrary rational number frequency turnaround ratios in space transponders. Rational number frequency turnaround ratios such as 240/221 (transmit over receive) at S-band or 880/749 at X-band are required in space transponders. Traditionally, these ratios have been obtained using analog circuits. The continued emphasis on smaller and more integrated transponders has led to the use of digital circuitry. This thrust has caused the turnaround problem to be partially implemented using digital circuitry. In particular, Doppler frequency ranges are relatively low (<1–2 MHz). NCOs are well suited for generating frequencies in this range. Therefore, turning the Doppler frequency around by the correct frequency ratio is desirable using NCOs.

For example, an NCO may be used in the transmitter to produce the correct transmitter Doppler frequency. The NCO frequency resolution needed is, in general, less than one least significant bit (LSB) of the NCO frequency word. Thus, what is needed is a method and apparatus, where the denominator of the rational number is not necessarily a power of 2, for synthesizing time-averaged rational frequencies using a numerically controlled oscillator. What is also needed is a method for calculating frequency control numbers and duty cycles for synthesizing a time-averaged rational frequency using a numerically controlled oscillator.

BRIEF DESCRIPTION OF THE DRAWINGS

The invention is pointed out with particularity in the appended claims. However, a more complete understanding of the present invention may be derived by referring to the detailed description and claims when considered in connection with the figures:

Figure 1:
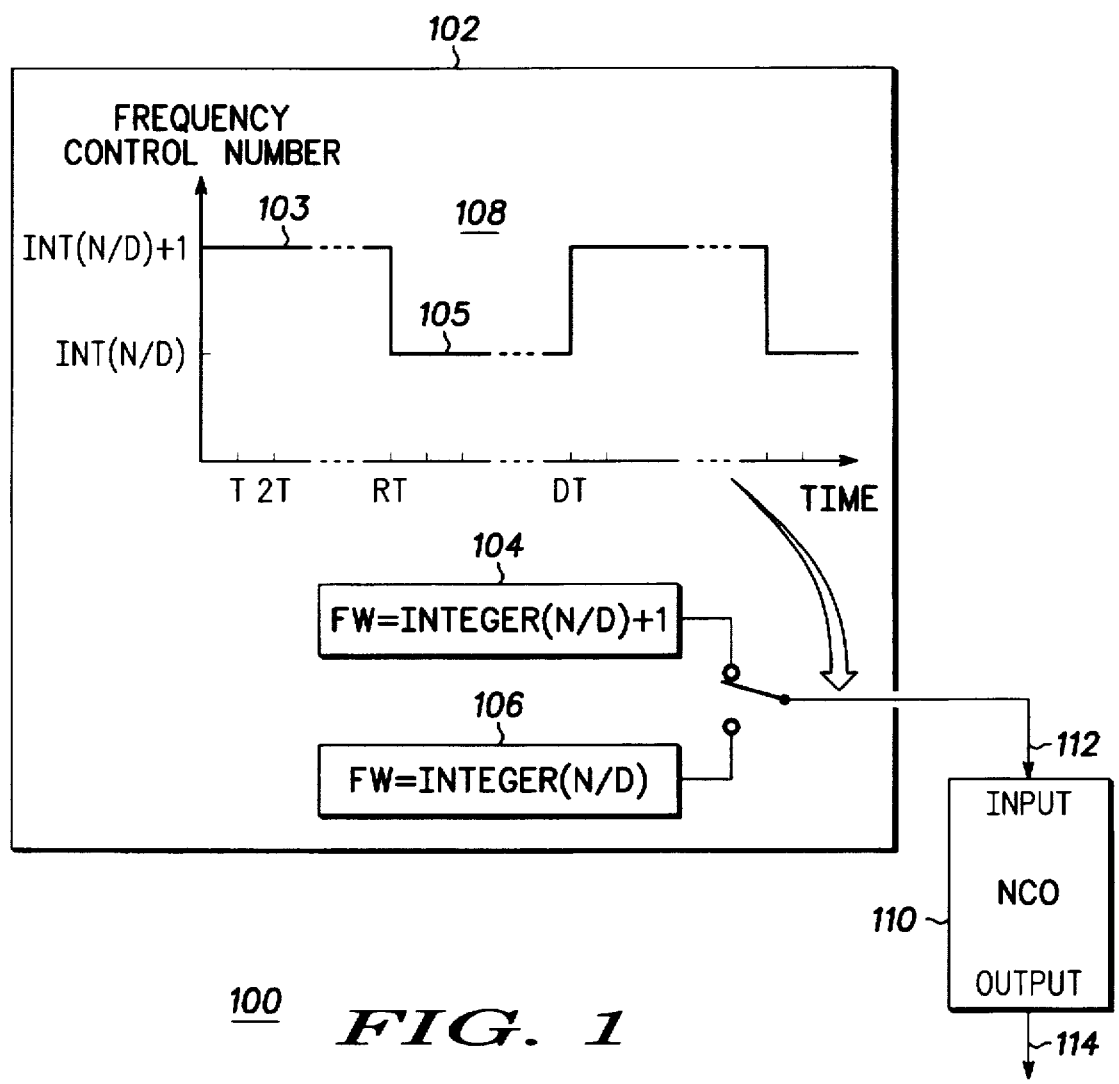
FIG. 1 is a block diagram of a time-averaged rational frequency generator for synthesizing a time-averaged rational frequency, in accordance with an embodiment of the present invention.

The exemplification set out herein includes a preferred embodiment of the invention in one form thereof, and such exemplification is not intended to be construed as limiting in any manner.

DETAILED DESCRIPTION OF THE DRAWING

The present invention provides, among other things, an apparatus and method for enabling a numerically controlled oscillator (NCO) to generate a signal with a time-averaged frequency proportional to a rational number, even if the number of bits in the binary frequency control number is insufficient to represent the fractional part of the rational number precisely.

FIG. 1 is a block diagram of a time-averaged rational frequency generator for synthesizing a time-averaged rational frequency, in accordance with an embodiment of the present invention. A time-averaged rational frequency generator 100 synthesizes a "rational" frequency falling between the stepped "integer" frequencies individually obtainable by a numerically controlled oscillator. An NCO individually generates frequency outputs increasing in a step-wise manner as frequency control words are incrementally altered.

In the present invention, an NCO controller 102, after a desired rational frequency is identified, generates an NCO input waveform 108 for inputting or driving NCO 110. As shown in NCO input waveform 108, frequency control numbers alternate between numerically adjacent values. These numerically adjacent values are generated according to the method of FIG. 2 and comprise an integer frequency control number 106 and an incremented integer frequency control number 104.

Because a rational frequency cannot be generated by either of these control numbers without having a round-off or truncation error, the time-average of the generated rational frequency falls between these adjacent control numbers. The duty cycle for switching or alternating between the control numbers is proportional to the denominator of the rational number.

Let the rational frequency be given by $$N/D,$$

where N and D are the numerator and denominator, respectively, and both are positive, nonzero integers. This ratio can be represented as $$N/D = INT(N/D) + R/D$$

where $INT(N/D)$ denotes the integer part of $N/D$, and R is the remainder. Inasmuch as a frequency-control number, FW, must be an integer, it would be necessary to make FW alternate between $INT(N/D)$ and $INT(N/D)+1$ in order to obtain an averaged frequency proportional to N/D. Other portions of a frequency control circuit may include a loop filter having an update period, DT, that can be divided into D equal intervals of duration T. Then in a given update cycle, the frequency can be toggled up and down to obtain the desired time-averaged rational frequency by inputting INT (N/D)+1 during R intervals and INT(N/D) during the remaining D-R intervals.

Integer frequency control number 106 and incremented integer frequency control number 104 are alternately input into an NCO input 112 proportionally with the desired rational frequency. NCO input 112 provides the numeric control number input into NCO 110 to instruct NCO 110 to generate an NCO output 114 accordingly.

NCO controller 102 may include a microprocessor or controller for performing calculating steps such as defining a frequency update period, converting a rational frequency into a ratio, converting the ratio into an integer and fractional portion, and converting the integer portion into a frequency control number. A microprocessor or controller may also provide the means for alternating between adjacent frequency control numbers or this feature may alternatively be performed by an adder or similar incrementable device capable of being incremented between adjacent counting values.

Figure 2:
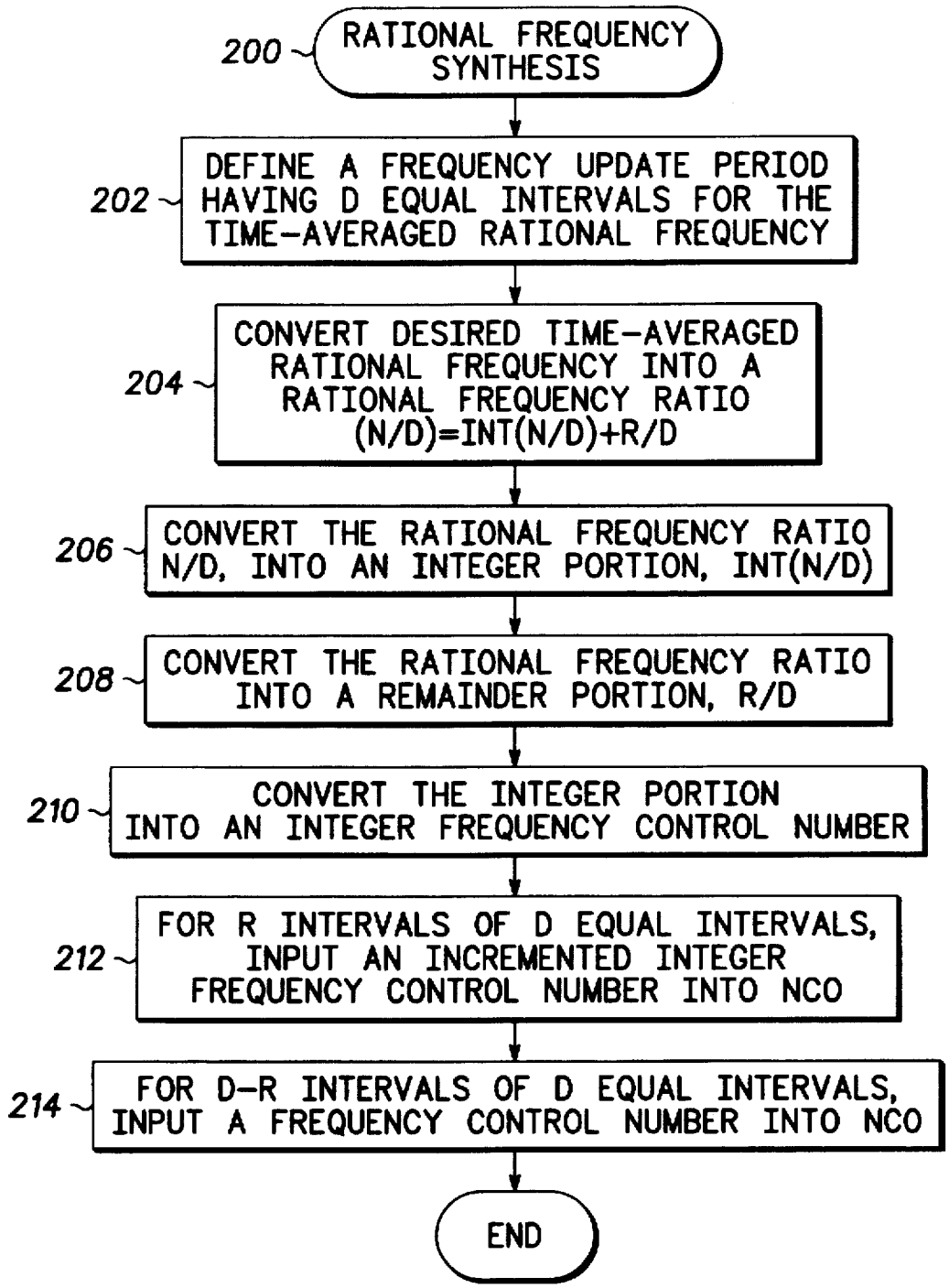
FIG. 2 is a flowchart of a method for synthesizing a time-averaged rational frequency using a numerically controlled oscillator, in accordance with an embodiment of the present invention.

FIG. 2 is a flowchart of a method for synthesizing a time-averaged rational frequency using a numerically controlled oscillator, in accordance with a preferred embodiment of the present invention. A rational frequency synthesis method 200 may be thought of as a frequency interpolation employing time-averaging of inputs to NCO 110 (FIG. 1).

A task 202 defines a frequency update period having D equal intervals for the time-averaged rational frequency. A frequency update period may be a function of a loop filter included in other portions of the frequency circuitry. NCO controller 102 (FIG. 1) selects a value for D equal intervals to correspond with a denominator for representation of the desired rational frequency in fractional form.

Tasks 204–210 calculate numerically adjacent values from the rational frequency for input into NCO 110. A task 204 converts the desired rational frequency into a rational frequency ratio, N/D. N is the numerator value used in conjunction with D, the denominator, for fractionally representing the desired rational frequency. NCO controller 102 selects N and D such that the fractional representation of the desired frequency using N/D results in tolerable rounding or approximation.

A task 206 converts the rational frequency ratio, N/D, into an integer portion. The rational frequency, N/D, may be represented as $$N/D = INT(N/D) + R/D$$

where the integer portion, INT(N/D), represents the truncated portion of the rational frequency.

A task 208 converts the rational frequency ratio, N/D, into a remainder portion, R/D, where R/D represents the remaining fractional portion after the integer portion is factored out. The remainder portion represents the frequency differential of the rational frequency unattainable by a single frequency control number input to an NCO. Because the rational frequency was represented using D equal intervals, R/D represents a proportion of a duty cycle employed in generating NCO input waveform 108 (FIG. 1) for time averaging and hence generating the rational frequency.

A task 210 converts the integer portion into an integer frequency control number 106 (FIG. 1) for inputting into NCO 110. Integer frequency control number 106 corresponds to an output frequency directly synthesizable by NCO 110 that is incrementally immediately less than the rational frequency.

A task 212 inputs incremented integer frequency control number 104 (FIG. 1) into NCO 110 for a quantity of R intervals of D equal intervals. NCO controller 102 derives incremented integer frequency control number 104 by incrementing integer frequency control number 106 from task 210. Incremented integer frequency control number 104 corresponds to an output frequency directly synthesizable by NCO 110 that is incrementally immediately greater than the rational frequency. NCO input 112 (FIG. 1) receives incremented integer frequency control number 104 for a portion of update period, DT represented by R.

A task 214 inputs integer frequency control number 106 (FIG. 1) into NCO 110 for a quantity of D-R intervals of D equal intervals. NCO controller 102 alternates the frequency control numbers between these numerically adjacent values to generate a time-averaged rational frequency.

In response to tasks 212 and 214, NCO 110 outputs a time-averaged rational number frequency at NCO output 114. This method may be thought of as frequency interpolation. As described above, it is implemented by toggling between an integer frequency control number and an incremented integer frequency control number. In addition, this toggling may be accomplished by toggling the least significant bit of a frequency word when an integer frequency control number is even, or if NCO 110 has a carry-in port, then toggling the carry-in input.

Any spurious effects generated by alternating or toggling frequency control numbers have very low levels and may be predicted mathematically. Assume the frequency control number into NCO 110 is:

$$FCN_{NCO} = \left\{ \begin{array}{l} FCN + 1\ R\ \text{times} \\ FCN\ D - R\ \text{times} \end{array} \right\}$$

The average frequency word is:

$$FCN_{AVE} = \left\{ \begin{array}{l} [(FCN+1)*R + FCN*(D-R)]/D \\ FCN + R/D \end{array} \right.$$

With this average (or DC) component removed, the resulting frequency number (or AC component) is a squarewave. The squarewave amplitude characteristics are:

$$+ \left( 1 - \frac{R}{D} \right) \text{ for } R \text{ counts}$$

$$- \frac{R}{D} \text{ for } (D - R) \text{ counts}$$

Let this squarewave function be designated as s(1). NCO 110 output may be written as:

$$\sin\left[ 2\pi \cdot FCN_{AVE} \cdot \frac{jF_{CT}}{2^N} + 2\pi \sum_{l=0}^{j} \frac{s(l) \cdot F_{CT}}{2^N} \right]$$

where j is the NCO clock time count, N the number of NCO bits and $F_{CT}$ the NCO clock frequency. Now assume that the phase deviation from this squarewave function is small, which is a valid assumption since the amplitude of s(I) is below 1 least significant bit of the NCO frequency number. The above equation may be approximated using trigonometric identities as:

$$= \sin\left[ 2\pi \cdot FW_{AVE} \cdot \frac{jF_{CT}}{2^N} \right] +$$

$$\left[ 2\pi \sum_{l=0}^{j} \frac{s(l) \cdot F_{CT}}{2^N} \right] \cdot \cos \left[ 2\pi \cdot FW_{AVE} \cdot \frac{jF_{CT}}{2^N} \right]$$

The amplitude of the cosine function above is a triangle waveform. The zero-to-peak amplitude is:

$$1/2 \left[ 2\pi \frac{F_{CT}}{2^N} \left(1 - \frac{R}{D}\right) RT \right]$$

where DT is the cycle time of the squarewave function.

Empirical data was measured from a gallium arsenide NCO and digital-to-analog converter using the following parameters:

$F_{CT}$=262.4 MHz
N=32
R=111
D=221
T=1/4000

Using these numbers in the above equation yields an amplitude of 0.00265 or 51.5 dBc.

The waveform is triangular instead of square in this example and thus, the first harmonic is below the zero-to-peak amplitude by $8/\pi^2$ or −1.82 dB. Also, for a double sided amplitude, another 6 dB is subtracted. The calculated result, −51.5−1.82−6=−59.3 dBc, corresponds with the measured result.

Thus, a method and apparatus for synthesizing or generating a time-averaged rational frequency from a numerically controlled oscillator by inputting frequency control numbers and altering the frequency control numbers between numerically adjacent values, thereby outputting a time-averaged rational frequency with frequency resolution less than 1 NCO least significant bit, has been described. Also a method for calculating frequency control numbers and a corresponding duty cycle for each frequency control number for synthesizing a time-averaged rational frequency using a numerically controlled oscillator has been disclosed.

The present invention overcomes the aforementioned problems of an NCO individually being limited in frequency generation to integer values or increments equivalent to the stepped granularity of the NCO. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for synthesizing a time-averaged rational frequency which is proportional to a rational number using a numerically controlled oscillator (NCO) in a frequency control loop, comprising the steps of:

inputting frequency control numbers to said numerically controlled oscillator using an output from a loop filter in said frequency control loop;

alternating said frequency control numbers between numerically adjacent values using a first toggling pattern; and outputting said time-averaged rational frequency in response to said frequency control numbers, wherein at least one spurious frequency is minimized by using said first toggling pattern.

2. A method as recited in claim 1, wherein said alternating step further comprises the steps of:

defining an update period DT having D equal intervals of duration T for said time-averaged rational frequency;

converting said rational number into an integer portion and a remainder portion, wherein said integer portion represents a truncated portion of said rational number and said remainder portion represents a fractional portion remaining after said integer portion is factored out of said rational number;

converting said integer portion into an integer frequency control number; and converting said remainder portion into said first toggling pattern having a first number of equal intervals of duration T in which an incremented integer frequency control number is input to said numerically controlled oscillator and having a second number of said equal intervals of duration T in which said integer frequency control number is input to said numerically controlled oscillator.

3. A method as recited in claim 2, said method further comprising the steps of:

inputting said incremented integer frequency control number to said numerically controlled oscillator for said first number of intervals, wherein said first number of equal intervals are randomly spaced in said update period; and inputting said integer frequency control number to said numerically controlled oscillator for said second number of intervals, wherein said second number equals said D minus said first number.

4. A method as recited in claim 2, wherein said method further comprises the steps of:

inputting said incremented integer frequency control number to said numerically controlled oscillator for said first number of intervals, wherein said first number of equal intervals are spaced substantially equally in said update period; and inputting said integer frequency control number to said numerically controlled oscillator for said second number of intervals, wherein said second number equals said D minus said first number.

5. A method as recited in claim 2, wherein said method further comprises the steps of:

a) inputting said incremented integer frequency control number to said numerically controlled oscillator for one of said equal intervals;

b) inputting said integer frequency control number to said numerically controlled oscillator for another one of said equal intervals;

c) repeating steps a) and b) for said first number of times; and d) inputting said incremented integer frequency control number to said numerically controlled oscillator for a remaining number of said equal intervals wherein said remaining number equals said D minus two times said first number, when said second number is larger than said first number.

6. A method as recited in claim 2, wherein said method further comprises the steps of:

inputting said incremented integer frequency control number to said numerically controlled oscillator for said first number of intervals, wherein said first number of equal intervals are spaced consecutively in said update period; and inputting said integer frequency control number to said numerically controlled oscillator for said second number of intervals, wherein said second number of equal intervals are spaced consecutively in said update period after said first number of intervals.

7. A method for calculating frequency control numbers with a duty cycle for synthesizing a time-averaged rational frequency which is proportional to a rational number with at least one spurious frequency minimized using a numerically controlled oscillator (NCO) comprising the steps of:

defining a frequency update period DT having D equal intervals of duration T for said time-averaged rational frequency;

converting said rational number into a ratio, N/D, wherein said D equal intervals define a denominator of said ratio and N is a numerator and both are positive, non-zero integers;

converting said ratio into an integer portion and a remainder portion, R/D wherein said integer portion represents a truncated portion of said ratio and said remainder portion, R/D represents a fractional portion remaining after said integer portion is factored out of said ratio and R is a positive non-zero integer;

converting said integer portion into an integer frequency control number, said integer frequency control number being one of said frequency control numbers, and an incremented integer frequency control number, said incremented integer frequency control number being a second one of said frequency control numbers; and determining said duty cycle to minimize said at least one spurious frequency.

8. A method as recited in claim 7, wherein said determining step further comprises the steps of:

defining a first portion of said duty cycle using R intervals of said D equal intervals for said incremented integer frequency control number and said R intervals are positioned within said update period to minimize said at least one spurious frequency; and defining a second portion of said duty cycle using D-R intervals of said D equal intervals for said integer frequency control number and said D-R intervals are positioned within said update period to minimize said at least one spurious frequency.

9. A time-averaged rational frequency generator for synthesizing time-averaged rational frequency which is proportional to a rational number with at least one spurious frequency minimized comprising:

a numerically controlled oscillator (NCO) controller for inputting frequency control numbers and for alternating said frequency control numbers between numerically adjacent values using a first toggling pattern to minimize at least one spurious frequency; and a numerically controlled oscillator coupled to said NCO controller for outputting said time-averaged rational frequency in response to said frequency control numbers.

10. A time-averaged rational frequency generator as recited in claim 9, wherein said NCO controller further comprises:

means for defining an update period DT having D equal intervals of duration T for said time-averaged rational frequency;

means for converting said rational number into an integer portion and a remainder portion wherein said integer portion represents a truncated portion of said rational number and said remainder portion represents a fractional portion remaining after said integer portion is factored out of said rational number;

means for converting said integer portion into an integer frequency control number; and means for converting said remainder portion into said first toggling pattern having a first number of equal intervals of duration T in which an incremented integer frequency control number is input to said numerically controlled oscillator and having a second number of said equal intervals of duration T in which said integer frequency control number is input to said numerically controlled oscillator.

11. A time-averaged rational frequency generator as recited in claim 10, wherein said NCO controller further comprises:

means for inputting said incremented integer frequency control number to said numerically controlled oscillator for said first number of intervals, wherein said first number of equal intervals are randomly spaced in said update period; and means for inputting said integer frequency control number to said numerically controlled oscillator for said second number of intervals, wherein said second number equals said D minus said first number.

12. A time-averaged rational frequency generator as recited in claim 10, wherein said NCO controller further comprises:

means for inputting said incremented integer frequency control number to said numerically controlled oscillator for said first number of intervals, wherein said first number of equal intervals are spaced substantially equally in said update period; and means for inputting said integer frequency control number to said numerically controlled oscillator for said second number of intervals, wherein said second number equals said D minus said first number.

13. A time-averaged rational frequency generator as recited in claim 10, wherein said NCO controller further comprises:

means for a) inputting said incremented integer frequency control number to said numerically controlled oscillator for one of said equal intervals and b) inputting said integer frequency control number to said numerically controlled oscillator for another one of said equal intervals and c) repeating steps a) and b) for said first number of times and d) inputting said incremented integer frequency control number to said numerically controlled oscillator for a remaining number of said equal intervals wherein said remaining number equals said D minus two times said first number, when said second number is larger than said first number.

14. A time-averaged rational frequency generator as recited in claim 10, wherein said NCO controller further comprises:

means for inputting said incremented integer frequency control number to said numerically controlled oscillator for said first number of intervals, wherein said first number of equal intervals are spaced consecutively in said update period; and means for inputting said integer frequency control number to said numerically controlled oscillator for said second number of intervals, wherein said second number of equal intervals are spaced consecutively in said update period after said first number of intervals.

15. A numerically controlled oscillator (NCO) controller for calculating frequency control numbers with a duty cycle for synthesizing a time-averaged rational frequency which is proportional to a rational number with at least one spurious frequency minimized using a numerically controlled oscillator, comprising:

means for defining an update period DT having D equal intervals of duration T for said time-averaged rational frequency;

means for converting said rational number into a ratio, N/D, wherein said D equal intervals defines a denominator of said ratio and N is a numerator and both are positive, non-zero integers;

means for converting said ratio into an integer portion and a remainder portion, R/D, wherein said integer portion represents a truncated portion of said ratio and said remainder portion, R/D represents a fractional portion remaining after said integer portion is factored out of said ratio and R is a positive non-zero integer;

means for converting said ratio into an integer portion and a remainder portion, R/D, wherein said integer portion represents a truncated portion of said ratio and said remainder portion, R/D represents a fractional portion remaining after said integer portion is factored out of said ratio and R is a positive non-zero integer;

means for converting said integer portion into an integer frequency control number, said integer frequency control number being one of said frequency control numbers and an incremented integer frequency control number, said incremented integer frequency control number being a second one of said frequency control numbers; and means for determining said duty cycle to minimize said at least one spurious frequency.

16. An NCO controller as recited in claim 15, wherein said NCO controller further comprises:

means for defining a first portion of said duty cycle using R intervals of said D equal intervals for said incremented integer frequency control number and said R intervals are positioned within said update period to minimize said at least one spurious frequency; and means for defining a second portion of said duty cycle using D-R intervals of said D equal intervals for said integer frequency control number and said D-R intervals are positioned within said update period to minimize said at least one spurious frequency.

* * * * *